United States Patent [19]

Ishino et al.

[11] Patent Number: 4,983,675

[45] Date of Patent: * Jan. 8, 1991

[54] CROSSLINKED MOLDED PRODUCT

[75] Inventors: Iwao Ishino; Akihiko Ohno; Tsutomu Isaka, all of Mie, Japan

[73] Assignee: Mitsubishi Petrochemical Co., Ltd., Tokyo, Japan

[ * ] Notice: The portion of the term of this patent subsequent to Aug. 25, 2004 has been disclaimed.

[21] Appl. No.: 316,525

[22] Filed: Feb. 27, 1989

Related U.S. Application Data

[63] Continuation of Ser. No. 88,388, Aug. 24, 1987, abandoned, which is a continuation-in-part of Ser. No. 942,781, Dec. 17, 1986, abandoned, which is a continuation of Ser. No. 826,301, Feb. 5, 1985, Pat. No. 4,689,369.

[30] Foreign Application Priority Data

Feb. 25, 1985 [JP] Japan ................. 60-36004

[51] Int. Cl.$^5$ ............................... C08F 8/00
[52] U.S. Cl. ................... 525/100; 525/288; 525/326.5; 526/279
[58] Field of Search ......... 525/100, 288, 326.5; 526/279

[56] References Cited

U.S. PATENT DOCUMENTS

| | | | |
|---|---|---|---|
| 3,637,899 | 1/1972 | Nometkin et al. ................. | 525/100 |
| 3,764,589 | 10/1973 | Bond, Jr. et al. ................. | 525/326.5 |
| 3,776,977 | 12/1973 | Chadha ............................ | 525/100 |
| 3,865,897 | 2/1975 | Falender et al. .................. | 525/100 |
| 4,043,953 | 8/1977 | Chang et al. ..................... | 526/279 |
| 4,191,713 | 3/1980 | Yonezawa et al. ................ | 525/326.5 |
| 4,297,310 | 10/1981 | Akutsu et al. .................... | 525/326.5 |
| 4,412,042 | 10/1983 | Matsura et al. ................... | 525/326.5 |
| 4,444,948 | 4/1984 | Hochstrasser et al. ........... | 525/288 |
| 4,446,283 | 5/1984 | Doi et al. .......................... | 526/279 |

FOREIGN PATENT DOCUMENTS 0007765 2/1980 European Pat. Off. .

*Primary Examiner*—Bernard Lipman
*Attorney, Agent, or Firm*—Oblon, Spivak, McClelland, Maier & Neustadt

[57] ABSTRACT

A silane-crosslinkable copolymer composition comprising: (A) 100 parts by weight of a copolymer prepared by radically polymerizing a polymerizable monomeric mixture consisting essentially of ethylene and at least one ethylenically unsaturated silane compound selected from the group consisting of vinyltrimethoxysilane, vinyltriethoxysilane and γ-methacryloxypropyltrimethoxysilane under a pressure ranging from 1,000 to 4,000 kg/cm$^2$, and containing said silane compound in an amount of from 0.5 to 2 wt %; (B) from 0.001 to 10 parts by weight of a silanol condensation catalyst; and (C) from 0.01 to 5 parts by weight of a silane compound having a hydrolyzable organic group.

7 Claims, No Drawings

CROSSLINKED MOLDED PRODUCT

CROSS REFERENCE TO RELATED APPLICATIONS

This application is a continuation of Ser. No. 088,388, filed on Aug. 24, 1987, now abandoned, which is a continuation-in-part of Ser. No. 942,781, filed Dec. 17, 1986, now abandoned, which is a continuation of Ser. No. 826,301, filed Feb. 5, 1985, now U.S. Pat. No. 4,689,369.

BACKGROUND OF THE INVENTION

1. Field of the Invention

The present invention relates to a silane-crosslinkable copolymer composition which can provide extrudates having improved appearance without decreasing the crosslinking rate at the initial stage of cross-linking of a crosslinkable ethylene copolymer and can be used in various molding fields.

2. Discussion of the Background

A method of silane-crosslinking a molded product of an ethylene copolymer graft-modified with an unsaturated silane compound, using water is described, for example, in Japanese Patent Publication No. 1711/73. This crosslinking method is advantageous over other methods, e.g., crosslinking using organic peroxides or radiation, in that equipment is simple, the limitations on the molding conditions are small, and the operation is easy.

For example, in the production of crosslinked electric power cables, the moldable temperature range in the crosslinking method using organic peroxides is from 120° to 140° C., whereas it is possible in the silane-crosslinking method to mold at the molding temperature of an uncrosslinked ethylene polymer, i.e., high temperatures.

Thus, the silane-crosslinking method which is industrially excellent is widely utilized in various fields, e.g., electric power cables, pipes, tubes, films, sheets, hollow moldings and foamed moldings.

An ethylene copolymer obtained by radical polymerization of ethylene and an unsaturated silane compound is economically advantageous and is used, as described, for example, in Japanese Patent Application (OPI) No. 9611/80 (the term "OPI" as used herein refers to a "published unexamined Japanese patent application").

However, in molding and crosslinking by the silane-crosslinking using the ethylene copolymer, condensation reaction occurs at the initial stage in an extruder during extrusion molding and unevenness tends to occur on the surface of a molding. This is an extremely great defect which deteriorates the commercial value of the product, and the improvement thereof is strongly demanded.

SUMMARY OF THE INVENTION

As a result of various studies to overcome the problems encountered in the prior art, it has been found that the problems can be overcome without decreasing the rate of crosslinking in its initial stage if a specified amount of a silane compound having an organic group which is hydrolyzable during extrusion is added to a silane-crosslinkable ethylene copolymer to which a silanol condensation catalyst has been added. The present invention has been accomplished on the basis of this finding.

Accordingly, an object of the present invention is to provide a silane-crosslinkable copolymer composition comprising:

(A) 100 parts by weight of a copolymer prepared by radically polymerizing a polymerizable monomeric mixture consisting essentially of ethylene and an ethylenically unsaturated silane compound having a hydrolyzable organic group under a high pressure, and containing the silane compound in an amount of from 0.1 to 5 wt%;

(B) from 0.001 to 10 parts by weight of a silanol condensation catalyst; and (C) from 0.01 to 5 parts by weight of a silane compound having a hydrolyzable organic group.

DETAILED DESCRIPTION OF THE INVENTION

The ethylene copolymer used as Component (A) in the composition of the present invention is a copolymer consisting essentially of ethylene and an ethylenically unsaturated silane compound having a hydrolyzable organic group.

The term "consisting essentially of" used herein means that the ethylene copolymer can contain up to 30 wt% of copolymerizable monomers other than ethylene and the ethylenically unsaturated silane compound having a hydrolyzable organic group. Examples of such optional monomers include α-olefins such as propylene, hexane-1 and 4-methylpentene-1; vinyl esters such as vinyl acetate and vinyl butyrate; unsaturated organic acid derivatives such as methyl acrylate and methyl methacrylate; unsaturated aromatic monomers such as styrene and α-methylstyrene; and vinyl ethers such as vinylmethyl ether and vinylphenyl ether. These optional monomers can be present in the ethylene copolymer in any form, e.g., a graft form, a random form or a block form.

The ethylenically unsaturated silane compound which can be used is selected from various compounds having an ethylenically unsaturated bond copolymerizable with ethylene, and a hydrolyzable silane group. These compounds are represented by the formula:

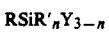

wherein R is an ethylenically unsaturated hydrocarbyl or hydrocarbyloxy group; R' is an aliphatic saturated hydrocarbyl group; Y which is the same or different is a hydrolyzable organic group; and n is 0, 1 or 2.

Examples of the unsaturated silane compounds are the compounds of the above described formula wherein R is vinyl, allyl, isopropenyl, butenyl, cyclohexenyl or γ-methacryloxypropyl; Y is methoxy, ethoxy, formyloxy, acetoxy, propionoxy, alkyl or arylamino; and R' is methyl, ethyl, propyl, decyl or phenyl.

The particularly preferred unsaturated silane compounds are compounds represented by the following formula, and γ-methacryloxypropyltrimethoxysilane:

wherein A is a hydrocarbyl group having 1 to 8, preferably 1 to 4 carbon atoms.

The most preferred unsaturated silane compounds are vinyltrimethoxysilane, vinyltriethoxysilane and γ-methacryloxypropyltrimethoxysilane.

Ethylene and the unsaturated silane compound are copolymerized under any conditions such that copolymerization of the two monomers occur. More specifically, those monomers are copolymerized under a pressure of 500 to 4,000 kg/cm$^2$, preferably 1,000 to 4,000 kg/cm$^2$, and at a temperature of 100° to 400° C., preferably 150° to 350° C., in the presence of a radical polymerization initiator, optionally together with up to about 30 wt% of a comonomer and a chain transfer agent. The two monomers are brought into contact with each other simultaneously or stepwise in a vessel or tube type reactor, preferably in a vessel type reactor.

In the copolymerization of ethylene and the unsaturated silane compound, any radical polymerization initiators, comonomers and chain transfer agents, which are conventionally used in homopolymerization of ethylene or copolymerization of ethylene with other monomers can be used.

Examples of radical polymerization initiators include (a) organic peroxides such as lauroyl peroxide, dipropionyl peroxide, benzoyl peroxide, di-t-butyl peroxide, t-butyl hydroperoxide, and t-butyl peroxyisobutyrate; (b) molecular oxygen; and (c) azo compounds such as azobisisobutyronitrile and azoisobutylvaleronitrile.

Examples of the optional comonomers are the same as the above described copolymerizable monomers.

Examples of the chain transfer agent include (a) paraffinic hydrocarbons such as methane, ethane, propane, butane and pentane; (b) α-olefins such as propylene, butene-1 and hexene-1; (c) aldehydes such as formaldehyde, acetaldehyde and n-butylaldehyde; (d) ketones such as acetone, methyl ethyl ketone and cyclohexanone; (e) aromatic hydrocarbons; and (f) chlorinated hydrocarbons.

The copolymer used in the composition of the present invention contains 0.1 to 5 wt%, preferably 0.3 to 3 wt%, and more preferably 0.5 to 2 wt%, of the unsaturated silane compound unit.

The higher the content of the unsaturated silane compound in the copolymer, the greater the mechanical strength and heat resistance of the silane-crosslinked product thereof. However, if the content of such unsaturated silane compound is excessively high, the tensile elongation and heat sealability of the crosslinked product are reduced. In view of this, the content of the unsaturated silane compound in the copolymer is limited to the range of 0.1 to 5 wt%. This copolymer can be blended with other olefinic polymers, and even in this case, the content of the unsaturated silane compound in the blend must be limited to the range of 0.1 to 5 wt%.

The silanol condensation catalyst used as Component (B) in the composition of the present invention is generally selected from the compounds which can be conventionally used as a catalyst for accelerating dehydration condensation between silanol groups.

Examples of the silanol condensation catalyst are carboxylic acid salts of metals such as tin, zinc, iron, lead and cobalt, organic bases, inorganic acids, and organic acids.

Representative examples of the silanol condensation catalysts are (1) carboxylic acids of metals such as dibutyltin dilaurate, dibutyltin diacetate, dibutyltin dioctoate, stannous acetate, stannous caprylate, lead naphthenate, lead caprylate and cobalt naphthenate; (2) organic bases such as ethylamine, dibutylamine, hexylamine and pyridine; (3) inorganic acids such as sulfuric acid and hydrochloric acid; and (4) organic acids such as toluenesulfonic acid, acetic acid, stearic acid and maleic acid.

The silanol condensation catalyst is used in an amount of 0.001 to 10 parts, preferably 0.01 to 5 parts, and more preferably 0.01 to 3 parts, by weight per 100 parts by weight of the ethylene copolymer as Component (A). If the amount of the silanol condensation catalyst is less than 0.001 part by weight per 100 parts by weight of Component (A), the crosslinking reaction does not proceed sufficiently. If, on the other hand, the amount of the silanol condensation catalyst is more than 10 parts by weight per 100 parts by weight of Component (A), local gelation proceeds in the extruder during extrusion and the extrudate has a very poor appearance.

The silane compound having a hydrolyzable organic group used as Component (C) can be a saturated or unsaturated silane so long as it has a hydrolyzable organic group. In view of easy availability, the ethylenically unsaturated silane compound constituting Component (A) is preferably used. Suitable examples of silane compounds containing a hydrolyzable organic group include n-butyltrimethoxysilane, n-propylmethyoxysilane, di-n-butyldimethoxysilane, vinyltriacetoxysilane, n-propyltrimethoxysilane, dimethyldimethoxysilane, diethyldimethoxysilane, vinyltris(β-methoxyethoxysilane, and the like. The most preferred silane compounds are vinyltrimethoxysilane, vinyltriethoxysilane, and γ-methacryloxypropyltrimethoxysilane.

Component (C) is used in an amount of 0.01 to 5 parts, preferably 0.05 to 3 parts, and more preferably 0.1 to 2 parts, by weight per 100 parts by weight of the ethylene copolymer used as Component (A). If the amount of Component (C) is less than 0.01 part by weight per 100 parts by weight of the ethylene copolymer, the desired effect of the present invention cannot be obtained. If, on the other hand, the amount of Component (C) is more than 5 parts by weight per 100 parts by weight of the ethylene copolymer, the rate of crosslinking at its initial stage decreases considerably and, in order to obtain a product having a sufficient heat resistance, the crosslinking treatment time increases, resulting in deterioration of operation efficiency.

The composition of the present invention is sufficient if only it has the above described compositions prior to kneading. For example, Components (A), (B) and (C) may be prepared into the desired composition in a kneader. Kneading can be conducted by conventional methods, and use of an extruder is preferred. The kneaded product is then silane-crosslinked with water (including moisture).

The composition of the present invention exhibits a remarkable effect such that the appearance of the molded product obtained is improved by the simple manner of adding a suitable amount of the silane compound as Component (C) at extrusion kneading, and this greatly increases the practical value of the composition of the present invention as a molding material for a resin molding.

Having generally described this invention, a further understanding can be obtained by reference to certain specific examples which are provided herein for purposes of illustration only and are not intended to be limiting unless otherwise specified.

EXAMPLES 1-12 AND COMPARATIVE EXAMPLES 1-18

The ethylene copolymer of Example 1 shown in the Table below was prepared by the following procedures.

A reactor (inner capacity: 1.5 liters) equipped with a stirrer was fed with a mixture of ethylene, vinyltrimethoxysilane and propylene (molecular weight modifier), and t-butyl peroxyisobutyrate (radical generator) under the conditions shown below, so as to continuously produce an ethylene-vinyltrimethoxysilane copolymer.
Amount Fed:

| Ethylene | 43 kg/hr |
|---|---|
| Vinyltrimethoxysilane | 0.39 kg/hr |
| Propylene | 0.65 kg/hr |
| t-Butylperoxyisobutyrate | 2.1 g/hr |

Temperature of Monomers Fed:
65° C.
Polymerization Pressure:
2,000 kg/cm²
Maximum Reaction Temperature:
241° C.
Amount Produced:
5.8 kg/hr In Examples 2 to 12 and Comparative Examples 1 to 18, copolymers were prepared in the same manner as in Example 1 except that the starting materials and their amounts fed were changed as shown in the Table below.

To 100 parts by weight of each of the copolymers, 5 parts by weight of a catalyst master batch composed of polyethylene containing 1 wt% of dibutylin dilaurate and a silane compound having a hydrolyzable organic group (the type and amount of the silane compound are shown in the Table) were added. The mixture was fed into a full tapered type screw extruder (diameter: 20 mm; L/D: 20; compression ratio: 2.5) and extrusion molded into a columnar strand having a diameter of 2 mm at extrusion temperature of 200° C. and the number of screw revolutions of 50 rpm.

The strands were evaluated for their appearance by the following criteria.
o: Completely smooth surface
Δ: Appreciable unevenness of the surface
x: Remarkable unevenness over the entire surface The strands were immersed in hot water (80° C.) for 7 hours and their gel fractions were measured by extracting a 0.5 g sample of each strand with boiling xylene in a Soxhlet extractor for 16 hours.

The content of the ethylenically unsaturated silane compound in each of the copolymers was measured with an infrared spectrophotometer.

The results of evaluation are shown in the Table 1 below.

TABLE 1

| Ex. No. | Comp. Ex. No. | Ethylenically Unsaturated Silane Compound in Ethylene Copolymer Type | Amount (wt %) | Silane Compound Having Hydrolyzable Organic Group Type | Amount (parts by weight*) | Appearance | Gel Fraction (wt %) |
|---|---|---|---|---|---|---|---|
| 1 | | Vinyltrimethoxysilane | 1.5 | Vinyltrimethoxysilane | 0.02 | o | 72 |
| 2 | | Vinyltrimethoxysilane | 1.5 | Vinyltrimethoxysilane | 4.5 | o | 70 |
| 3 | | γ-Methacryloxylpropyl-trimethoxysilane | 1.5 | γ-Methacryloxypropyl-trimethoxysilane | 0.02 | o | 71 |
| 4 | | γ-Methacryloxypropyl-trimethoxysilane | 1.5 | γ-Methacryloxypropyl-trimethoxysilane | 4.5 | o | 70 |
| 5 | | Vinyltriethoxysilane | 2.0 | γ-Methacryloxypropyl-trimethoxysilane | 0.02 | o | 71 |
| 6 | | Vinyltriethoxysilane | 2.0 | γ-Methacryloxypropyl-trimethoxysilane | 4.5 | o | 70 |
| 7 | | Vinyltrimethoxysilane | 1.5 | Vinyltriethoxysilane | 0.02 | o | 72 |
| 8 | | Vinyltrimethoxysilane | 1.5 | Vinyltriethoxysilane | 4.5 | o | 70 |
| | 1 | Vinyltrimethoxysilane | 1.5 | — | — | x | 72 |
| | 2 | Vinyltrimethoxysilane | 1.5 | Vinyltrimethoxysilane | 0.008 | x | 72 |
| | 3 | Vinyltrimethoxysilane | 1.5 | Vinyltrimethoxysilane | 5.5 | o | 40 |
| | 4 | γ-Methacryloxypropyl-trimethoxysilane | 1.5 | — | — | x | 71 |
| | 5 | γ-Methacryloxypropyl-trimethoxysilane | 1.5 | γ-Methacryloxypropyl-trimethoxysilane | 0.008 | x | 71 |
| | 6 | γ-Methacryloxypropyl-trimethoxysilane | 1.5 | γ-Methacryloxypropyl-trimethoxysilane | 5.5 | o | 35 |
| 9 | | Vinyltrimethoxysilane | 3.0 | Vinyltrimethoxysilane | 0.02 | o | 80 |
| 10 | | Vinyltrimethoxysilane | 3.0 | Vinyltrimethoxysilane | 4.5 | o | 80 |
| 11 | | γ-Methacryloxypropyl-trimethoxysilane | 3.0 | γ-Methacryloxypropyl-trimethoxysilane | 0.02 | o | 80 |
| 12 | | γ-Methacryloxypropyl-trimethoxysilane | 3.0 | γ-Methacryloxypropyl-trimethoxysilane | 4.5 | o | 80 |
| | 7 | Vinyltrimethoxysilane | 3.0 | Vinyltrimethoxysilane | 0.008 | x | 80 |
| | 8 | Vinyltrimethoxysilane | 3.0 | Vinyltrimethoxysilane | 5.5 | o | 45 |
| | 9 | γ-Methacryloxypropyl-trimethoxysilane | 3.0 | γ-Methacryloxypropyl-trimethoxysilane | 0.008 | x | 80 |
| | 10 | γ-Methacryloxypropyl-trimethoxysilane | 3.0 | γ-Methacryloxypropyl-trimethoxysilane | 5.5 | o | 45 |
| | 11 | Vinyltrimethoxysilane | 0.08 | Vinyltrimethoxysilane | 0.02 | o | 10 |
| | 12 | Vinyltrimethoxysilane | 0.08 | Vinyltrimethoxysilane | 4.5 | o | 9 |
| | 13 | γ-Methacryloxypropyl-trimethoxysilane | 0.08 | γ-Methacryloxypropyl-trimethoxysilane | 0.02 | o | 8 |
| | 14 | γ-Methacryloxypropyl-trimethoxysilane | 0.08 | γ-Methacryloxypropyl-trimethoxysilane | 4.5 | o | 7 |
| | 15 | Vinyltrimethoxysilane | 5.5 | Vinyltrimethoxysilane | 0.02 | x | 90 |
| | 16 | Vinyltrimethoxysilane | 5.5 | Vinyltrimethoxysilane | 4.5 | x | 89 |
| | 17 | γ-Methacryloxypropyl-trimethoxysilane | 5.5 | γ-Methacryloxypropyl-trimethoxysilane | 0.02 | x | 89 |
| | 18 | γ-Methacryloxypropyl- | 5.5 | γ-Methacryloxypropyl- | 4.5 | x | 88 |

TABLE 1-continued

| | | Ethylenically Unsaturated Silane Compound in Ethylene Copolymer | | Silane Compound Having Hydrolyzable Organic Group | | | |
|---|---|---|---|---|---|---|---|
| Comp. Ex. No. | Ex. No. | Type | Amount (wt %) | Type | Amount (parts by weight*) | Appearance | Gel Fraction (wt %) |
| | | trimethoxysilane | | trimethoxysilane | | | |

*Per 100 parts by weight of the ethylene copolymer

EXAMPLES 13–51

Component (A) shown in Table 2 below was polymerized in the same manner as in Example 1. Using this polymerized product and Component (C) as shown in the Table 2, compositions were prepared and evaluated in the same manner in Example 1.

The results obtained are shown in Table 2.

TABLE 2

| Run No. | Component (A): Ethylenically Unsaturated Silane Compound in Ethylene Copolymer | | Component (C): Silane Compound Having Hydrolyzable Organic Group | | Appearance** | Gel Fraction (wt %) |
|---|---|---|---|---|---|---|
| | Type | Amount (wt. %) | Type | Amount (Parts by weight*) | | |
| 13 | Vinyltrimethoxysilane | 1.5 | n-Butyltrimethoxysilane | 0.008 | x | 72 |
| 14 | " | " | " | 0.02 | o | 71 |
| 15 | " | " | " | 4.5 | o | 70 |
| 16 | " | " | Vinyltriethoxysilane | 0.008 | x | 72 |
| 17 | " | " | " | 0.02 | o | 71 |
| 18 | " | " | " | 4.5 | o | 70 |
| 19 | " | " | n-Propyltrimethoxy-silane | 0.008 | x | 72 |
| 20 | " | " | " | 0.02 | o | 71 |
| 21 | " | " | " | 4.5 | o | 70 |
| 22 | " | " | di-n-Butyldimethoxy-silane | 0.008 | x | 72 |
| 23 | " | " | " | 0.02 | o | 71 |
| 24 | " | " | " | 4.5 | o | 70 |
| 25 | " | " | Vinyltriacetoxysilane | 0.008 | o | 72 |
| 26 | " | " | " | 0.02 | o | 71 |
| 27 | " | " | " | 4.5 | o | 70 |
| 28 | γ-Methacryloxypropyl-trimethoxysilane | 1.5 | n-Butyltrimethoxy-silane | 0.008 | x | 72 |
| 29 | γ-Methacryloxypropyl-trimethoxysilane | " | n-Butyltrimethoxy-silane | 0.02 | o | 71 |
| 30 | γ-Methacryloxypropyl-trimethoxysilane | " | n-Butyltrimethoxy-silane | 4.5 | o | 70 |
| 31 | γ-Methacryloxypropyl-trimethoxysilane | " | n-Propyltrimethoxy-silane | 0.008 | x | 72 |
| 32 | γ-Methacryloxypropyl-trimethoxysilane | " | n-Propyltrimethoxy-silane | 0.02 | o | 71 |
| 33 | γ-Methacryloxypropyl-trimethoxysilane | " | n-Propyltrimethoxy-silane | 4.5 | o | 70 |
| 34 | Vinyltrimethoxysilane | 1.5 | Dimethyldimethoxysilane | 0.008 | x | 72 |
| 35 | " | " | " | 0.02 | o | 71 |
| 36 | " | " | " | 4.5 | o | 70 |
| 37 | " | " | Diethyldimethoxysilane | 0.008 | x | 72 |
| 38 | " | " | " | 0.02 | o | 71 |
| 39 | " | " | " | 4.5 | o | 70 |
| 40 | " | " | Vinyltris(β-methoxyethoxy)silane | 0.008 | x | 72 |
| 41 | " | " | Vinyltris(β-methoxyethoxy)silane | 0.02 | o | 71 |
| 42 | " | " | Vinyltris(β-methoxyethoxy)silane | 4.5 | o | 70 |
| 43 | γ-Methacryloxypropyl-trimethoxysilane | 1.5 | Dimethyldimethoxysilane | 0.008 | x | 72 |
| 44 | γ-Methacryloxypropyl-trimethoxysilane | " | " | 0.02 | o | 71 |
| 45 | γ-Methacryloxypropyl-trimethoxysilane | " | " | 4.5 | o | 70 |
| 46 | γ-Methacryloxypropyl-trimethoxysilane | " | Diethyldimethoxysilane | 0.008 | x | 72 |
| 47 | γ-Methacryloxypropyl-trimethoxysilane | " | " | 0.02 | o | 71 |
| 48 | γ-Methacryloxypropyl-trimethoxysilane | " | " | 4.5 | o | 70 |
| 49 | γ-Methacryloxypropyl-trimethoxysilane | " | Vinyltris(β-methoxyethoxy)silane | 0.008 | x | 72 |
| 50 | γ-Methacryloxypropyl-trimethoxysilane | " | Vinyltris(β-methoxyethoxy)silane | 0.02 | o | 71 |
| 51 | γ-Methacryloxypropyl- | " | Vinyltris(β-methoxyethoxy) | 4.5 | o | 70 |

TABLE 2-continued

| Run No. | Component (A): Ethylenically Unsaturated Silane Compound in Ethylene Copolymer | | Component (C): Silane Compound Having Hydrolyzable Organic Group | | Appearance** | Gel Fraction (wt %) |
|---|---|---|---|---|---|---|
| | Type | Amount (wt. %) | Type | Amount (Parts by weight*) | | |
| | trimethoxysilane | | silane | | | |

*Per 100 parts by weight of the ethylene copolymer
**o: Completely smooth surface
x: Remarkable unevenness over the entire surface Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A crosslinked molded product having improved appearance produced by a process which comprises kneaded a mixture comprising
    (A) 100 parts by weight a copolymer prepared by radically polymerizing a polymerizable monomeric mixture consisting essentially of ethylene and at least one ethylenically unsaturated silane compound selected from the group consisting of vinyltrimethoxysilane, vinyltriethoxysilane and γ-methacryloxypropyltriethoxysilane in the presence of a radical polymerization initiator and chain transfer agent under pressure ranging from 1,000 to 4,000 kg/cm$^2$, and containing said silane compound in an amount of from 0.1 to 5 wt. %;
    (B) from 0.001 to 10 parts by weight of a catalyst for accelerating condensation between silanol groups of the ethylenically unsaturated silane compound; and
    (C) from 0.01 to 5 parts by weight of at least one silane compound having a hydrolyzable organic group selected from the group consisting of n-butyltrimethoxysilane, n-propyltrimethoxysilane, di-n-butyldimethoxysilane, dimethyldimethoxysilane and diethyldimethoxysilane;
    extruding the material obtained from the kneading step; and
    exposing the extruded material to water or moisture.

2. The crosslinked molded product as claimed in claim 1, wherein the content of units derived from said unsaturated silane compound in the copolymer is from 0.3 to 3 wt %.

3. The crosslinked molded product as claimed in claim 1, wherein the content of units derived from said unsaturated silane compound in the copolymer is from 0.5 to 2 wt.%.

4. The crosslinked molded product as claimed in claim 1, wherein the silanol condensation catalyst is used in an amount of 0.01 to 5 parts by weight per 100 parts by weight of component (A).

5. The crosslinked molded product as claimed in claim 4, wherein the amount of the catalyst is 0.01 to 3 parts by weight.

6. The crosslinked molded product as claimed in claim 1, wherein the amount of Component (C) is from 0.05 to 3 parts by weight per 100 parts by weight of Component (A).

7. The crosslinked molded product as claimed in claim 6, wherein the amount of the Component (C) is from 0.1 to 2 parts by weight.

* * * * *